US011363611B2

(12) United States Patent
Vivanco et al.

(10) Patent No.: US 11,363,611 B2
(45) Date of Patent: *Jun. 14, 2022

(54) OVERCOMING CARRIER AGGREGATION SIGNALING OVERHEAD WHEN FIRSTNET QOS POLICIES ARE ENFORCED

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Wenge Chen, Austin, TX (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,109

(22) Filed: Nov. 4, 2020

(65) Prior Publication Data

US 2021/0068124 A1 Mar. 4, 2021

Related U.S. Application Data

(63) Continuation of application No. 16/554,235, filed on Aug. 28, 2019, now Pat. No. 10,863,525.

(51) Int. Cl.
*H04W 72/08* (2009.01)
*H04L 5/00* (2006.01)
(Continued)

(52) U.S. Cl.
CPC ........... *H04W 72/085* (2013.01); *H04L 5/006* (2013.01); *H04L 5/0032* (2013.01);
(Continued)

(58) Field of Classification Search
None
See application file for complete search history.

(56) References Cited

U.S. PATENT DOCUMENTS 7,133,420 B2 * 11/2006 Chang ..................... H04W 4/12
709/227
9,655,127 B1 * 5/2017 Srinivas ............ H04W 72/0486
(Continued)

FOREIGN PATENT DOCUMENTS

CN 104868974 A * 8/2015 ........... H04L 45/245
CN 105873072 A * 8/2016
(Continued)

*Primary Examiner* — Jamaal Henson
(74) *Attorney, Agent, or Firm* — Guntin & Gust, PLC; Dana Lemoine

(57) ABSTRACT

Aspects of the subject disclosure may include, for example, initiating emergency QoS measures in a RAN cell responsive to detecting an emergency condition applicable to the RAN cell, identifying, among a plurality of wireless communication devices served by the RAN cell, a set of non-emergency devices, identifying, among the set of non-emergency devices, one or more carrier aggregation (CA)-prone devices, and applying an updated buffer threshold value for a CA-prone device among the one or more CA-prone devices, to reduce a likelihood of initiation of carrier aggregation for the CA-prone device. Other embodiments are disclosed.

20 Claims, 10 Drawing Sheets

(51) Int. Cl.
 *H04W 72/04* (2009.01)
 *H04L 47/20* (2022.01)
(52) U.S. Cl.
 CPC ............ *H04L 5/0053* (2013.01); *H04L 47/20* (2013.01); *H04W 72/048* (2013.01)

(56) References Cited

U.S. PATENT DOCUMENTS

| | | | |
|---|---|---|---|
| 2014/0280659 A1* | 9/2014 | Siram | H04L 51/24 709/207 |
| 2015/0281927 A1* | 10/2015 | Fiedler | H04W 4/90 455/404.1 |
| 2017/0086209 A1* | 3/2017 | Panchal | H04L 69/329 |
| 2017/0318445 A1* | 11/2017 | Kodaypak | H04W 4/90 |
| 2017/0374538 A1* | 12/2017 | Gellens | H04L 61/1511 |
| 2019/0280845 A1* | 9/2019 | Bedekar | H04W 24/10 |
| 2020/0015061 A1* | 1/2020 | Singh | H04B 17/336 |
| 2020/0045528 A1* | 2/2020 | Yanamandra | H04W 4/90 |
| 2020/0077407 A1* | 3/2020 | Srivastava | H04W 4/08 |
| 2020/0120470 A1* | 4/2020 | Arshad | H04W 8/065 |
| 2020/0137127 A1* | 4/2020 | Chin | H04L 65/1016 |

FOREIGN PATENT DOCUMENTS

| | | | | |
|---|---|---|---|---|
| JP | 2017523705 A | * | 8/2017 | |
| WO | WO-2018182972 A1 | * | 10/2018 | ........... H04B 17/336 |

* cited by examiner

OVERCOMING CARRIER AGGREGATION SIGNALING OVERHEAD WHEN FIRSTNET QOS POLICIES ARE ENFORCED

CROSS REFERENCE TO RELATED APPLICATIONS

This application is a continuation of U.S. patent application Ser. No. 16/554,235 filed Aug. 28, 2019. The contents of each of the foregoing are hereby incorporated by reference into this application as if set forth herein in full.

FIELD OF THE DISCLOSURE

The subject disclosure relates to quality-of-service (QoS)-aware carrier aggregation procedures.

BACKGROUND

In a radio access network (RAN) that supports RAN QoS features, RAN QoS policies may be defined such that under certain circumstances, certain types of devices and/or traffic are afforded priority with respect to traffic scheduling and radio frequency (RF) resource allocation. A RAN that supports RAN QoS features may also support carrier aggregation, according to which bandwidth/resources of multiple wireless component carriers may be aggregated to form composite channels that can convey data at higher rates. In such a RAN, the amount of wireless bandwidth/resources available for data transmission to a given device may potentially be affected by both the application of RAN QoS policies and the implementation of carrier aggregation for that device.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for implementing carrier aggregation in radio access networks featuring emergency-aware RAN-QoS schemes. Other embodiments are described in the subject disclosure. One or more aspects of the subject disclosure include initiating emergency QoS measures in a RAN cell responsive to detecting an emergency condition applicable to the RAN cell. One or more aspects of the subject disclosure include identifying a set of non-emergency devices from among a plurality of wireless communication devices served by the RAN cell in which emergency QoS measures are initiated. One or more aspects of the subject disclosure include identifying, among such an identified set of non-emergency devices, a device for which carrier aggregation is likely to be initiated as a result of emergency QoS measures. One or more aspects of the subject disclosure include applying an updated buffer threshold value for such a device, to reduce the likelihood that carrier aggregation will be initiated for that device.

Figure 1:
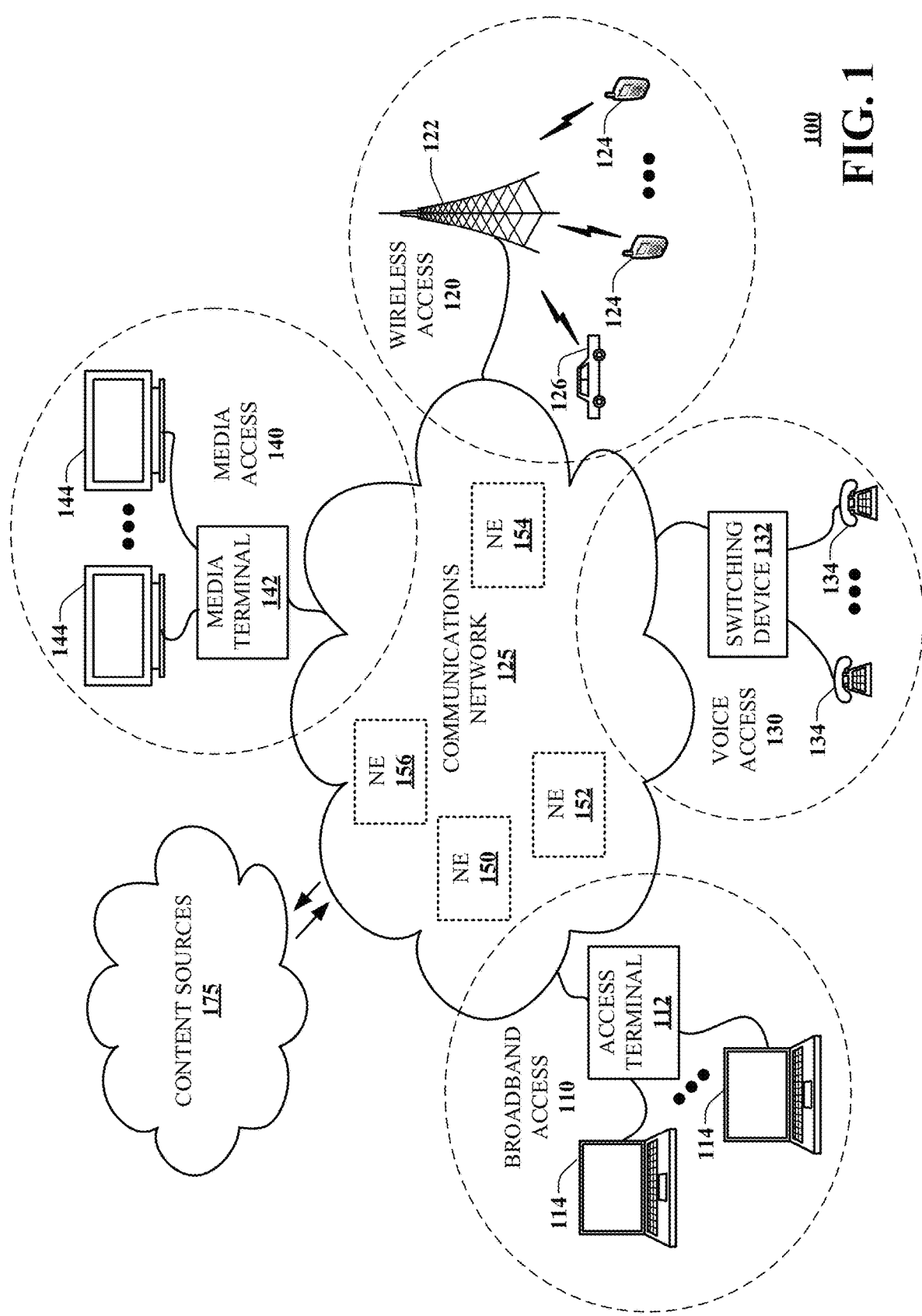
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part initiating emergency QoS measures in a RAN cell responsive to detecting an emergency condition applicable to the RAN cell, identifying a set of non-emergency devices from among a plurality of wireless communication devices served by a RAN cell in which emergency QoS measures are initiated, identifying a non-emergency device for which carrier aggregation is likely to be initiated as a result of emergency QoS measures, and/or applying an updated buffer threshold value for such a device to reduce the likelihood that carrier aggregation will be initiated for that device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
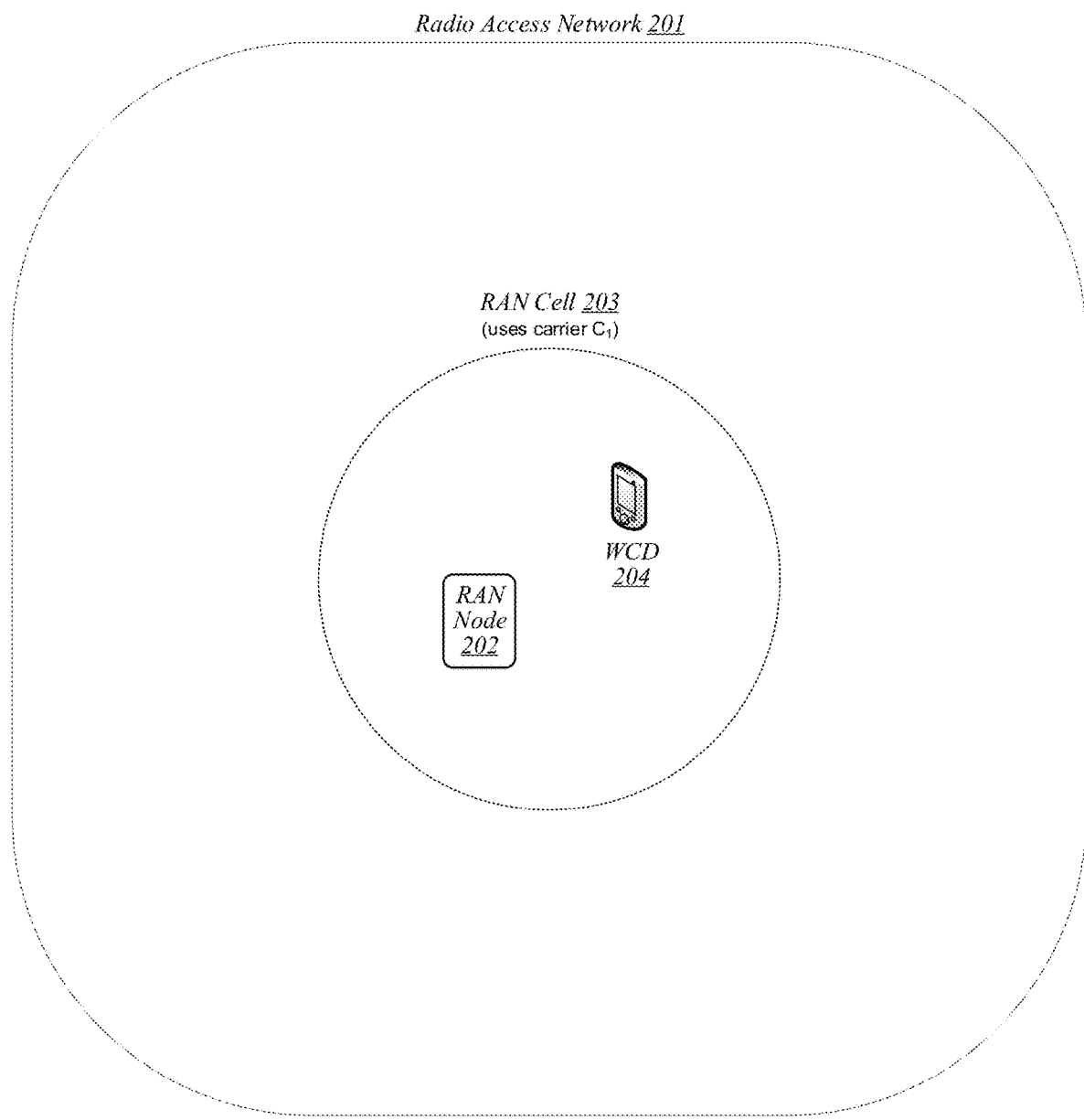
FIG. 2A is a block diagram illustrating an example, non-limiting embodiment of a first operating environment.

FIG. 2A illustrates an exemplary operating environment 200A such as may be representative of various embodiments. In operating environment 200A, a radio access network (RAN) 201 comprises a RAN node 202, which serves a RAN cell 203. A wireless carrier $C_1$ carries wireless communications between wireless communication devices in RAN cell 203. RAN cell 203 is a serving cell of a wireless communication device (WCD) 204. RAN node 202 uses bandwidth/resources of wireless carrier $C_1$ to transmit data to WCD 204. Such data may originate from a packet data network (PDN), such as the Internet.

According to various embodiments, radio access network 201 may represent a 3GPP 5G RAN, such as an NG-RAN. In some such embodiments, RAN node 202 may represent an NG-eNB or a gNB. In various other embodiments, radio access network 201 may represent a 3GPP LTE RAN, such as an E-UTRAN. In some such embodiments, RAN node 202 may represent an eNB. The embodiments are not limited to these examples.

Figure 2B:
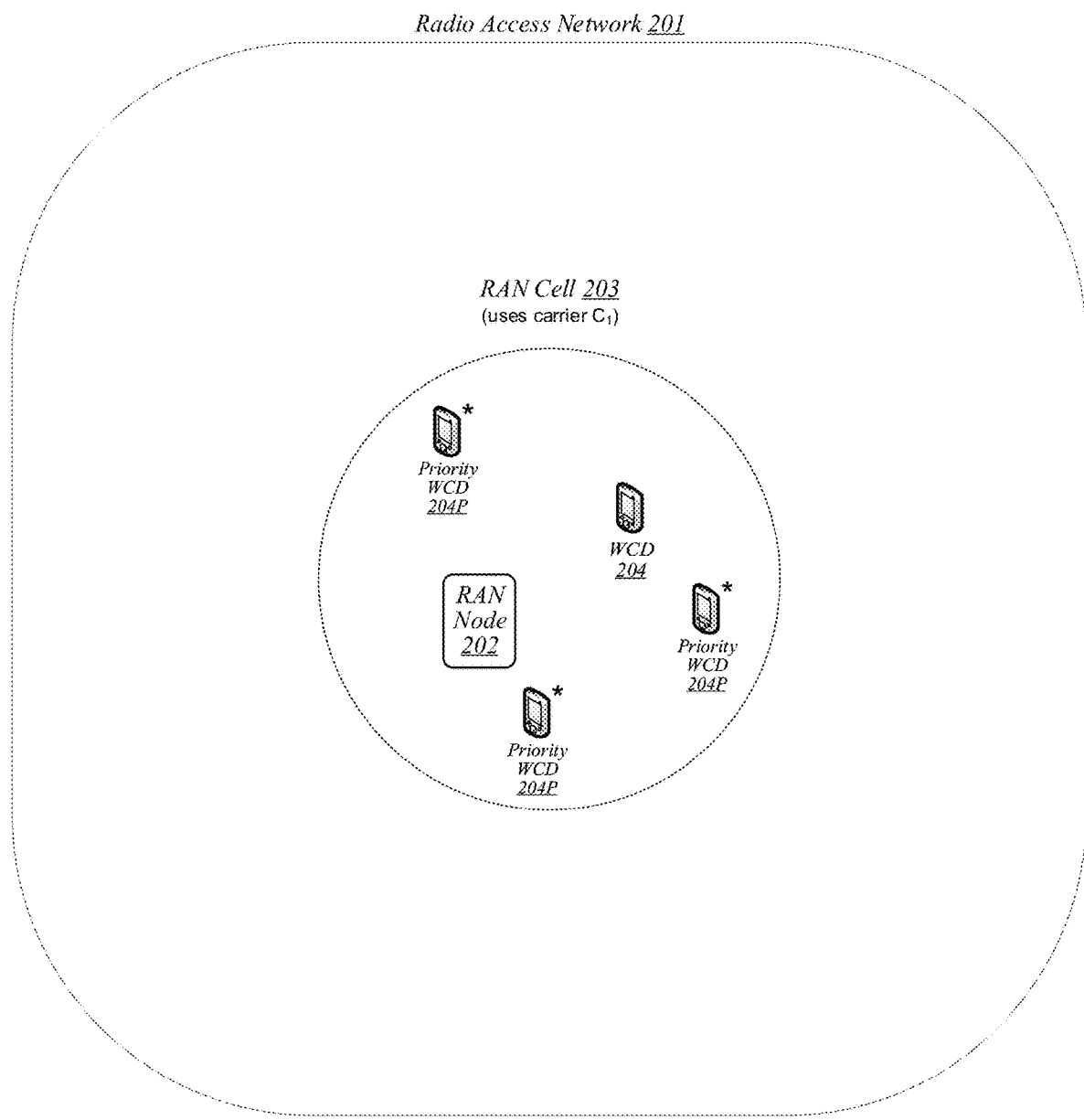
FIG. 2B is a block diagram illustrating an example, non-limiting embodiment of a second operating environment.

FIG. 2B illustrates an exemplary operating environment 200B. Operating environment 200B may be representative of various embodiments in which radio access network 201 of FIG. 2A implements a radio access network quality-of-service (RAN-QoS) framework. Such a RAN-QoS framework may generally constitute a set of rules/policies defining a prioritization system that is to govern allocation of wireless carrier bandwidth/resources and/or scheduling of data transmissions. In conjunction with scheduling data traffic and/or allocating wireless carrier bandwidth/resources for data transmissions, the prioritization system may generally differentiate on the basis of device type and/or traffic type. For example, radio access network 201 may implement a RAN-QoS framework according to which multiple QoS classes are defined, and differing priorities are recognized and applied with respect to the allocation of bandwidth/resources for wireless communications on the part of devices of differing QoS classes and/or scheduling transmissions of data to devices of differing QoS classes.

Operating environment 200B reflects a simple example scenario in which a RAN-QoS framework of radio access network 201 defines two QoS classes: a standard QoS class and a priority QoS class. In the context of this example, devices of the standard QoS class may be referred to as "standard-QoS devices", and devices of the priority QoS class may be referred to as "priority-QoS devices". WCD 204 is of the standard QoS class, and is thus a standard-QoS device. Also present within RAN cell 203 are various priority WCDs 204P, which are assigned the priority QoS class and are thus priority-QoS devices. In some embodiments, a QoS class identifier (QCI) parameter value may be used to differentiate between the various QoS classes defined by a RAN-QoS framework such as that implemented in operating environment 200B. For instance, in the scenario depicted in FIG. 2B, standard-QoS devices such as WCD 204 may be assigned a QCI value of 8, while priority-QoS devices such as priority WCDs 204P may be assigned a QCI value of 6.

In various embodiments, the RAN-QoS framework of radio access network 201 may feature RAN-QoS rules/policies designed to ensure the availability of at least a certain amount of bandwidth/resources of wireless carrier $C_1$ for use by priority-QoS devices. For example, RAN-QoS rules/policies of radio access network 201 may define a cap to be applied upon the amount of bandwidth/resources of wireless carrier $C_1$ made available for use by standard-QoS devices, reserving the remaining bandwidth/resources of wireless carrier $C_1$ for priority-QoS devices. Additionally or alternatively, RAN-QoS rules/policies of radio access network 201 may include QoS-aware scheduling procedures that give higher priority to priority-QoS devices than to standard-QoS devices for scheduling purposes, based on different delay budgets. The embodiments are not limited to these examples.

In some embodiments, the RAN-QoS framework of radio access network 201 may implement a RAN-QoS scheme comprising RAN-QoS rules/policies that take effect only under certain conditions. In some embodiments, for example, the RAN-QoS framework of radio access network 201 may implement a RAN-QoS scheme comprising RAN-QoS rules/policies that take effect in the event of a public emergency or disaster (an "emergency-aware" RAN-QoS scheme). In such embodiments, the priority QoS class may be reserved for wireless communication equipment of first responders such as paramedics, emergency medical technicians, police officers, firefighters, and search and rescue personnel, other public safety officials, and associated support personnel. Measures such as capping the bandwidth/resources available to standard-QoS devices within RAN cell 203 and prioritized scheduling for priority-QoS devices within RAN cell 203 may then be implemented upon the declaration of a public emergency or disaster affecting the geographic area/region of RAN cell 203. For example, upon the declaration of a public emergency or disaster affecting the geographic area/region of RAN cell 203, the radio frequency (RF) resources made available to standard-QoS devices such as WCD 204 may be capped at a certain threshold, such as 30% of the collective RF resources of wireless carrier $C_1$. The remaining 70% may be reserved for priority-QoS devices such as priority WCDs 204P, which may optionally be afforded the additional benefit of prioritized scheduling.

In some embodiments, the RAN-QoS framework of radio access network 201 may implement an emergency-aware RAN-QoS scheme that differentiates between multiple types/levels of public emergency or disaster and applies differing measures accordingly. In some embodiments, for example, an emergency-aware RAN-QoS scheme may be implemented that recognizes both a "level 1" emergency/disaster condition and a "level 2" emergency/disaster condition. According to the emergency-aware RAN-QoS scheme, the RF resources made available to standard-QoS devices such as WCD 204 may be capped at one threshold (such as 50%) in the event of a level 1 emergency/disaster condition affecting the geographic area/region of RAN cell 203, and may be capped at another, different threshold (such as 30%) in the event of a level 2 emergency/disaster condition. In some such embodiments, priority-QoS devices may be afforded prioritized scheduling in the event of a level 2 emergency/disaster condition, but not in the event of a level 1 emergency/disaster condition. In other embodiments, priority-QoS devices may be afforded prioritized scheduling in the event of either type of emergency/disaster condition, or priority scheduling may not be implemented.

According to various embodiments, radio access network 201 may be designated for use as a First Responder Network Authority (FirstNet) RAN. In such embodiments, the RAN-QoS framework of radio access network 201 may feature an emergency-aware RAN-QoS scheme according to which the implementation of RAN-QoS measures is contingent upon declaration of a disaster in accordance with FirstNet mechanisms. Priority WCDs 204P may correspond to FirstNet devices, which may be assigned the priority QoS class, while non-FirstNet devices such as WCD 204 may be assigned the standard QoS class.

Figure 2C:
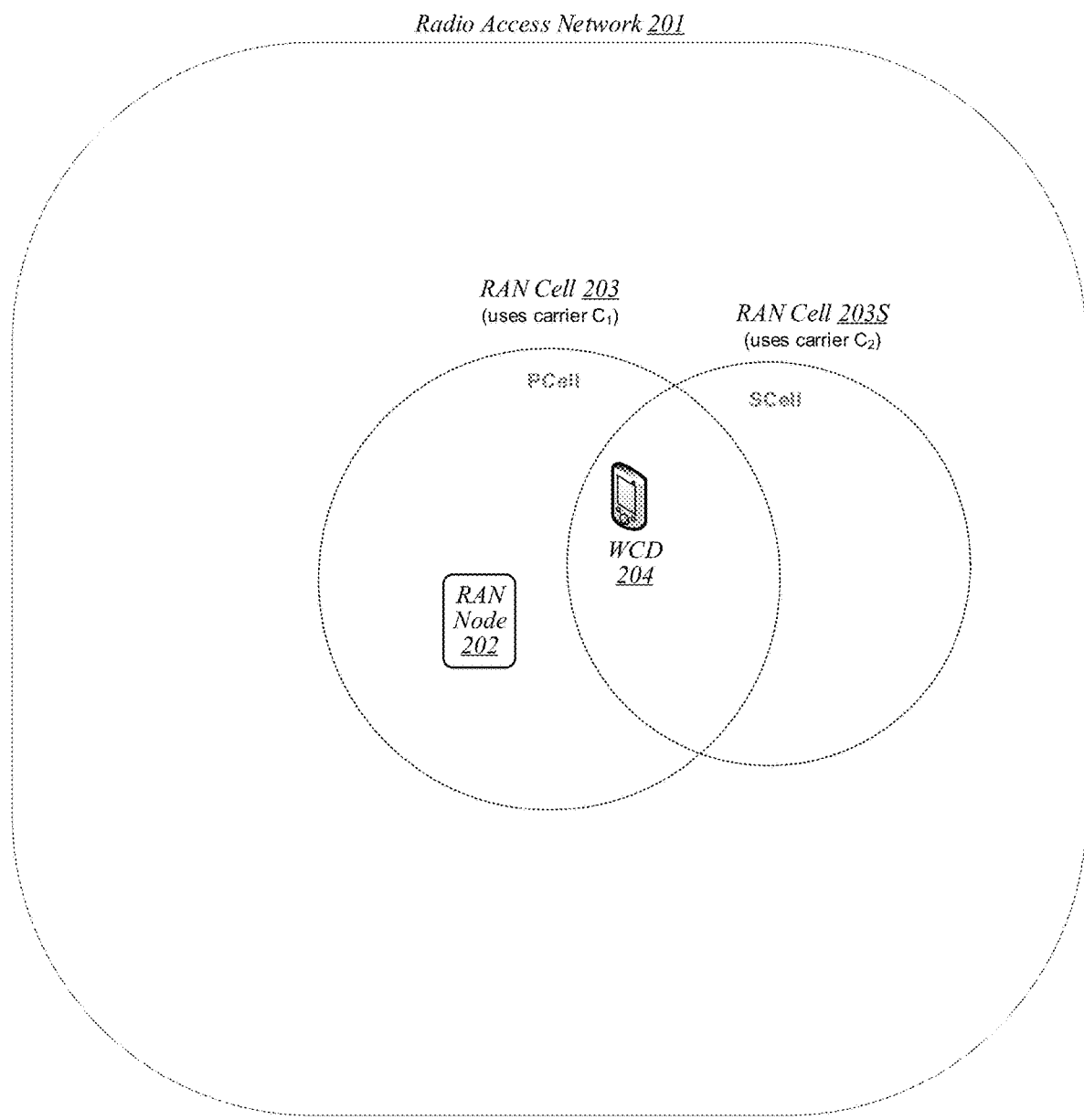
FIG. 2C is a block diagram illustrating an example, non-limiting embodiment of a third operating environment.

FIG. 2C illustrates an exemplary operating environment 200C that may be representative of various embodiments. In operating environment 200C, radio access network 201 and WCD 204 support carrier aggregation. Via carrier aggregation techniques, aggregated bandwidth/resources of multiple wireless carriers may be used to convey data transmissions to WCD 204. In the example scenario reflected in FIG. 2C, data may be transmitted to WCD 204 using aggregated bandwidth/resources of both the wireless carrier $C_1$ of RAN cell 203 and a wireless carrier $C_2$ of a second RAN cell 203S. RAN cell 203 constitutes the PCell of WCD 204 in this example, while RAN cell 203S is an SCell of WCD 204. Aggregating available bandwidth/resources of wireless carrier $C_2$ with those that are allocated from wireless carrier $C_1$ may generally provide WCD 204 with a greater collective amount of bandwidth/resources via which to receive data, which may generally enable WCD 204 to receive data at a faster rate.

In some embodiments, WCD 204 may be configured to initiate carrier aggregation responsive to detecting a need for additional bandwidth/resources via which to receive data. In such embodiments, as long as RAN cell 203 is able to allocate sufficient bandwidth/resources of wireless carrier $C_1$ to convey data to WCD 204 at least as fast as data destined for WCD 204 arrives at RAN node 202, WCD 204 may operate in a "non-CA" mode of operation, receiving data via only wireless carrier $C_1$. In the event that data begins to arrive at RAN node 202 at a rate faster than it can be conveyed to WCD 204 using available resources of wireless carrier $C_1$, RAN node 202 may begin buffering that data in a UE buffer associated with WCD 204. If the condition persists and the amount of data stored in that UE buffer grows to exceed a predefined threshold value CA.BUFFER.THRES, RAN cell 203 may trigger carrier aggregation for WCD 204. An aggregated channel may then be formed by aggregating bandwidth/resources of wireless carrier $C_1$ with bandwidth/resources of wireless carrier $C_2$, and radio access network 201 may begin conveying data to WCD 204 via that aggregated channel.

It is worthy of note that although FIG. 2C depicts only a single SCell (RAN cell 203S), carrier aggregation may be implemented in operating environment 200C using greater numbers of component carriers according to some embodiments. In some embodiments, for example, radio access network 201 may represent an LTE network supporting carrier aggregation using up to five component carriers. In some other embodiments, radio access network 201 may represent a network that supports even greater number of component carriers. For example, in some embodiments, radio access network 201 may represent an LTE-A or 5G network that supports carrier aggregation using up to thirty-two component carriers, or even more.

Figure 3:
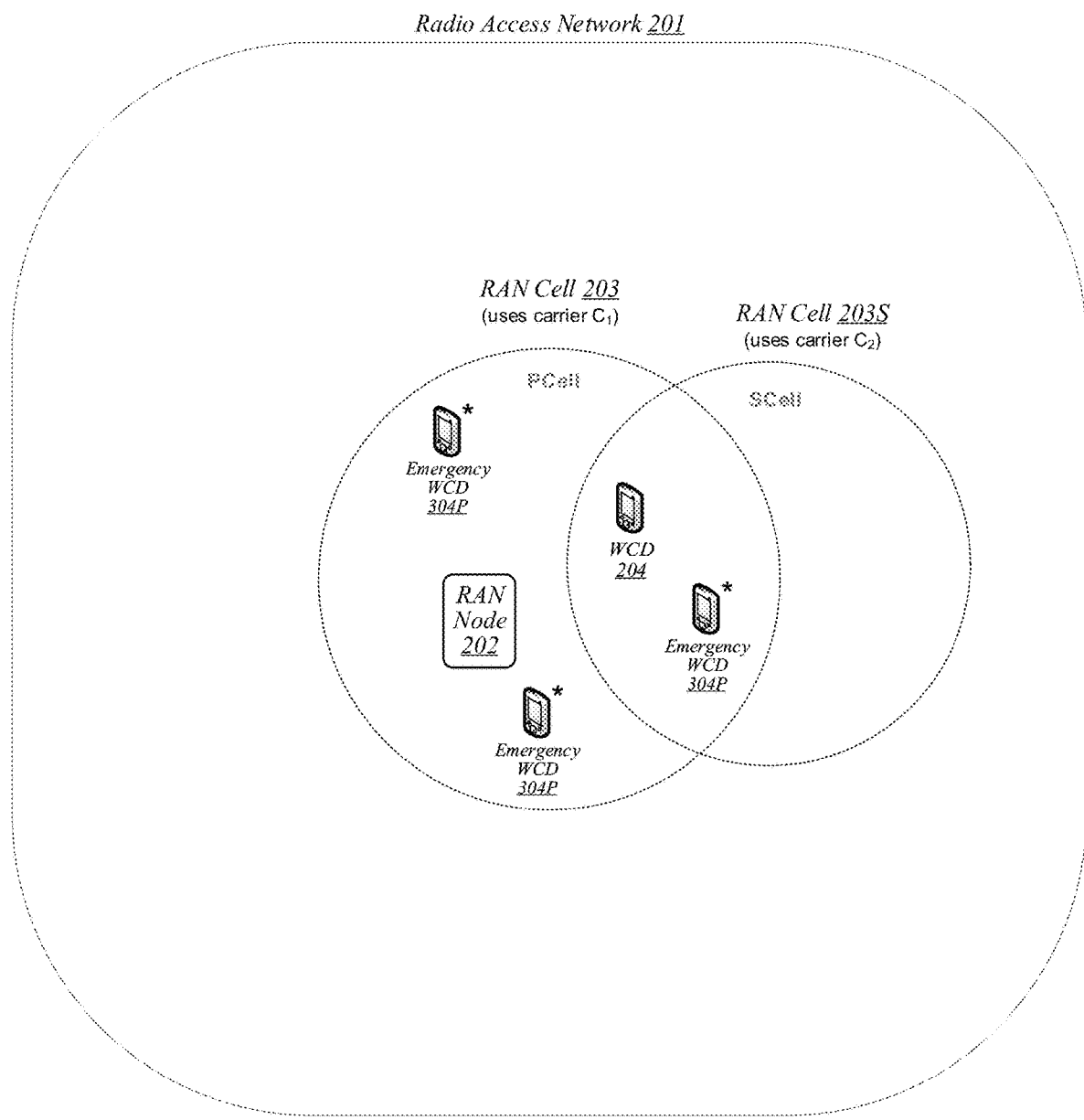
FIG. 3 is a block diagram illustrating an example, non-limiting embodiment of a fourth operating environment.

FIG. 3 illustrates an exemplary operating environment 300, which may generally be representative of various embodiments in which radio access network 201 implements an emergency-aware RAN-QoS scheme. Present within RAN cell 203 in operating environment 300 are WCD 204 and various emergency WCDs 304P, the latter of which may be assigned to a priority QoS class such that they benefit from reserved bandwidth and/or prioritized scheduling during emergency/disaster conditions. According to some embodiments, radio access network 201 may represent a RAN designated for use as a FirstNet RAN, priority WCDs 204P may represent FirstNet devices, and WCD 204 may represent a non-FirstNet device.

Under normal conditions (i.e., in the absence of an emergency/disaster condition), at a given point in time, data destined for WCD 204 may arrive at RAN node 202 and be transmitted to WCD 204 at a rate $R_1$, using the bandwidth/resources of wireless carrier $C_1$ that are allocated to WCD 204 at that time. If a public emergency or disaster affecting the geographic area/region of RAN cell 203 is declared, triggering emergency measures that involve reserving RF resources for emergency devices such as emergency WCDs 304P, the bandwidth/resource allocation of WCD 204 may be reduced. As a result of this reduction, it may be possible to transmit data to WCD 204 at a rate of only $R_2$, and RAN node 202 may begin buffering data destined for WCD 204 at a rate of $R_1$-$R_2$. As RAN node 202 continues buffering data destined for WCD 204, the amount of data in the UE buffer for WCD 204 may increase until it exceeds a predefined threshold value, at which point RAN cell 203 may initiate carrier aggregation for WCD 204.

Although WCD 204 is the only non-emergency WCD depicted in FIG. 3, it may represent only one of numerous such devices served by RAN cell 203 for which carrier aggregation is initiated as a result of the triggering of emergency measures in RAN cell 203. Many such devices may join WCD 204 in using RAN cell 203S as an SCell, In itself, this development may result in a significant increase in signaling overhead, and may cause strain upon the resources of the wireless carrier $C_2$ used in RAN cell 203S. If RAN cell 203S is also within the geographic area/region affected by the emergency/disaster, then emergency measures may also be in effect in RAN cell 203S. In this case, the strain upon the resources of wireless carrier $C_2$ may be especially pronounced. Less bandwidth/resources of wireless carrier $C_2$ may be available to non-emergency devices. At the same time, more devices may now compete for those resources, as the devices that were already being served by RAN cell 203S prior to the implementation of emergency measures in RAN cell 203S may be joined in competition by devices attempting to add RAN cell 203S as an SCell as a result of the implementation of emergency measures in other cells (such as RAN cell 203). The same effect may be observed in RAN cell 203, where devices served prior to the implementation of emergency measures therein may be subject to competition from devices attempting to add RAN cell 203 as an SCell as a result of the implementation of emergency measures in other cells (such as RAN cell 203S).

In a typical deployment scenario, many non-emergency devices served by radio access network 201 may use the provided data connectivity for applications requiring relatively high data rates, such as video streaming, for example. As a result of increased competition for resources during an emergency/disaster condition, it may be necessary to aggregate bandwidth/resources of a large number of component carriers in order to fashion an aggregate channel capable of achieving a data rate sufficient for such an application. If a significant number of devices in the RAN are capable of high-order carrier aggregation and attempt to implement it in order to maintain sufficient data rates, signaling overhead may increase dramatically, potentially becoming a significant drag on system performance for both emergency devices and non-emergency devices.

According to the novel techniques disclosed herein, radio access network 201 may implement QoS-aware carrier aggregation procedures in order to mitigate such potential effects. In various embodiments, the QoS-aware carrier aggregation procedures may take the existence of emergency/disaster conditions—and the effects of QoS policies triggered by such conditions—into account in conjunction with determining whether to initiate carrier aggregation. According to such QoS-aware carrier aggregation procedures, during emergency/disaster conditions, carrier aggregation may generally be initiated less readily than it is during normal operating conditions.

In various embodiments, in accordance with such QoS-aware carrier aggregation procedures, radio access network 201 may proactively detect the potential for inefficient resource allocation arising from emergency-induced carrier aggregation and take appropriate preventative measures. In some embodiments, during normal operating conditions, radio access network 201 may monitor the traffic patterns and traffic volumes of non-emergency devices, such as WCD 204. Information gathered via such monitoring may be used to predict the rates and/or manner in which UE buffers of the non-emergency devices will fill following the triggering of emergency measures.

In conjunction with QoS-aware carrier aggregation procedures in some embodiments, upon declaration of an emergency/disaster condition, RAN node 202 may identify a set of carrier aggregation (CA)-capable non-emergency WCDs served by RAN cell 203. In various embodiments, for each of the set of CA-capable non-emergency WCDs, RAN node 202 may determine whether bandwidth/resource restrictions applicable to non-emergency devices in RAN cell 203 are likely to trigger the initiation of carrier aggregation with respect to that CA-capable non-emergency WCD. A CA-capable non-emergency device with respect to which emergency QoS measures are likely to result in the initiation of carrier aggregation procedures may be referred to as a "CA-prone device". In some embodiments, this determination may be based on a comparison between the rate $\beta_t$ of DL data throughput to WCD 204 at the time t of the emergency/disaster declaration and the rate $\gamma$ to which throughput will be limited as a result of the subsequently imposed bandwidth/resource restrictions. In some embodiments, RAN node 202 may estimate $\gamma$ based on the value of $\beta_t$ and the extent of the imposed bandwidth/resource restrictions. For example, if the RF resources made available to non-emergency devices are capped at 30%, RAN node 202 may estimate $\gamma$ as $0.3*\beta_t$.

In some embodiments, for each device for which $\beta_t \geq \gamma$, RAN node 202 may estimate a parameter T representing an amount of time (such as a number of seconds) after which the amount of data stored in the UE buffer for that device will exceed a threshold value CA.BUFFER.THRESH. The parameter T may be referred to as a "buffer threshold time". In some embodiments, CA.BUFFER.THRESH may correspond to a predefined threshold value that defines the point at which carrier aggregation is triggered during normal operating conditions. In various embodiments, RAN node 202 may estimate the parameter T according to Equation (1) as follows:

$$T = \text{CA.BUFFER.THRESH}/(\beta_t - \gamma) + \varepsilon \quad (1)$$

where $\varepsilon$ is an error factor reflecting the variability of $\beta_t$ over time. According to some embodiments, in the case of a data traffic rate that is substantially constant, $\varepsilon$ may approach or equal 0. In the case of a data traffic rate that is expected to increase over time, $\varepsilon$ may be positive, while it may be negative in the case of a data traffic rate expected to decrease over time. In some embodiments, for each device for which $\beta_t \geq \gamma$, RAN node 202 may also identify the type of traffic that is being conveyed to that device at time t. In some embodiments, such a traffic type identification may be accomplished using a packet sniffer tool, such as DPI.

In various embodiments, RAN node 202 may configure updated CA buffer threshold values for some or all devices for which $\beta_t \geq \gamma$. For a given device A for which $\beta_t \geq \gamma$, RAN node 202 may configure an updated CA buffer threshold value CA.BUFFER.THRESH$_A$, where CA.BUFFER.THRESH$_A$>CA.BUFFER.THRESH. The larger the value of CA.BUFFER.THRESH$_A$, the lesser the likelihood that carrier aggregation will be triggered for that device A. In some embodiments, RAN node 202 may determine CA.BUFFER.THRESH$_A$ according to Equation (2) as follows:

$$\text{CA.BUFFER.THRESH}_A = \text{CA.BUFFER.THRESH} + \Delta \quad (2)$$

where $\Delta$ is selected based on the type of traffic being conveyed to device A and the burstiness characterizing that traffic.

In various embodiments, RAN node 202 may generally select a larger $\Delta$ value when the traffic being conveyed to device A is associated with a low-priority application (such as a P2P application) and a smaller $\Delta$ value when that traffic is associated with a high-priority application (such as a video application). In some embodiments, significant degradation of the user experience at device A may be expected if the traffic being conveyed to device A is bursty. In some embodiments, therefore, RAN node 202 may select an even smaller $\Delta$ value if the traffic being conveyed to device A is associated with a high-priority application and is expected to be bursty.

Figure 4:
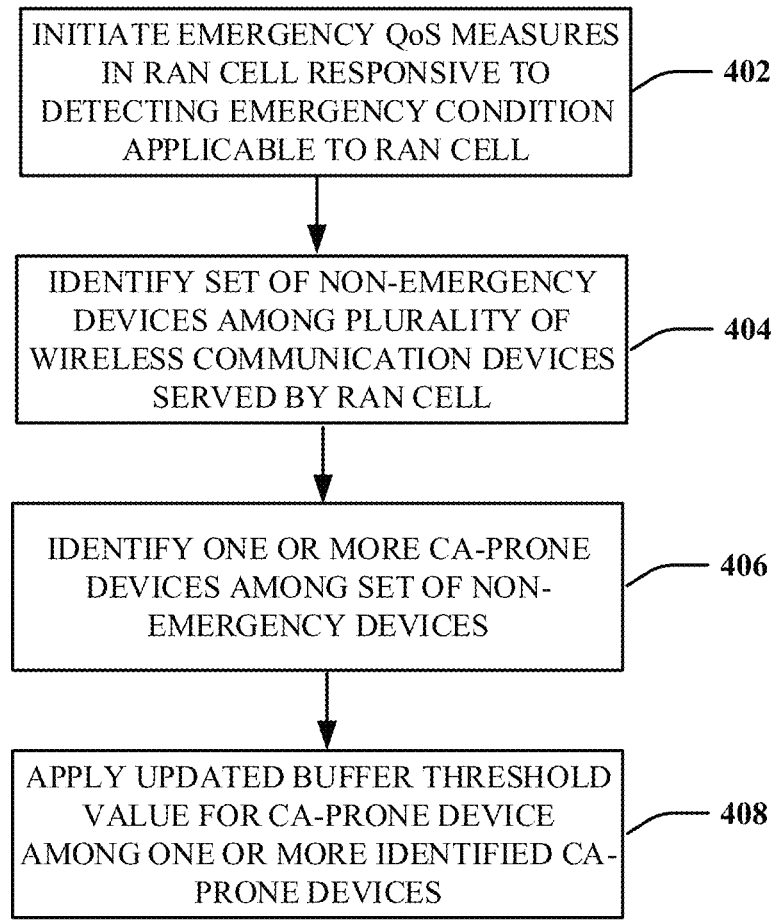
FIG. 4 depicts an illustrative embodiment of a method in accordance with various aspects described herein.

FIG. 4 depicts an illustrative embodiment of a method 400 in accordance with various aspects described herein. As shown in FIG. 4, emergency QoS measures may be initiated in a RAN cell at 402 responsive to detecting an emergency condition applicable to that RAN cell. At 404, a set of non-emergency devices may be identified among a plurality of wireless communication devices served by the RAN cell. In some embodiments, the set of non-emergency devices may be identified based on QoS class indices of the set of non-emergency devices.

At 406, one or more CA-prone devices may be identified among the set of non-emergency devices identified at 404. In some embodiments, the one or more CA-prone devices may comprise devices with respect to which the emergency QoS measures are likely to result in initiation of carrier aggregation procedures. In some embodiments, a set of CA-capable devices may be identified from among the set of non-emergency devices, and the one or more CA-prone devices may be identified from among the set of CA-capable devices.

At 408, an updated buffer threshold value may be applied for a CA-prone device identified at 406. In some embodiments, the CA-prone device may be selected based on a buffer threshold time for the CA-prone device. In some embodiments, the buffer threshold time for the CA-prone device may be determined based on a data throughput estimate for the CA-prone device. In some embodiments, the data throughput estimate for the CA-prone device may be determined based on traffic monitoring data for the CA-prone device, according to a queuing model.

In some embodiments, application of the updated buffer threshold value at 408 may reduce a likelihood that carrier aggregation will be initiated for the CA-prone device. In some embodiments, the updated buffer threshold value may be selected based on a type of traffic being conveyed to the CA-prone device. In some embodiments, the updated buffer threshold value may be selected based on a burstiness associated with traffic being conveyed to the CA-prone device.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
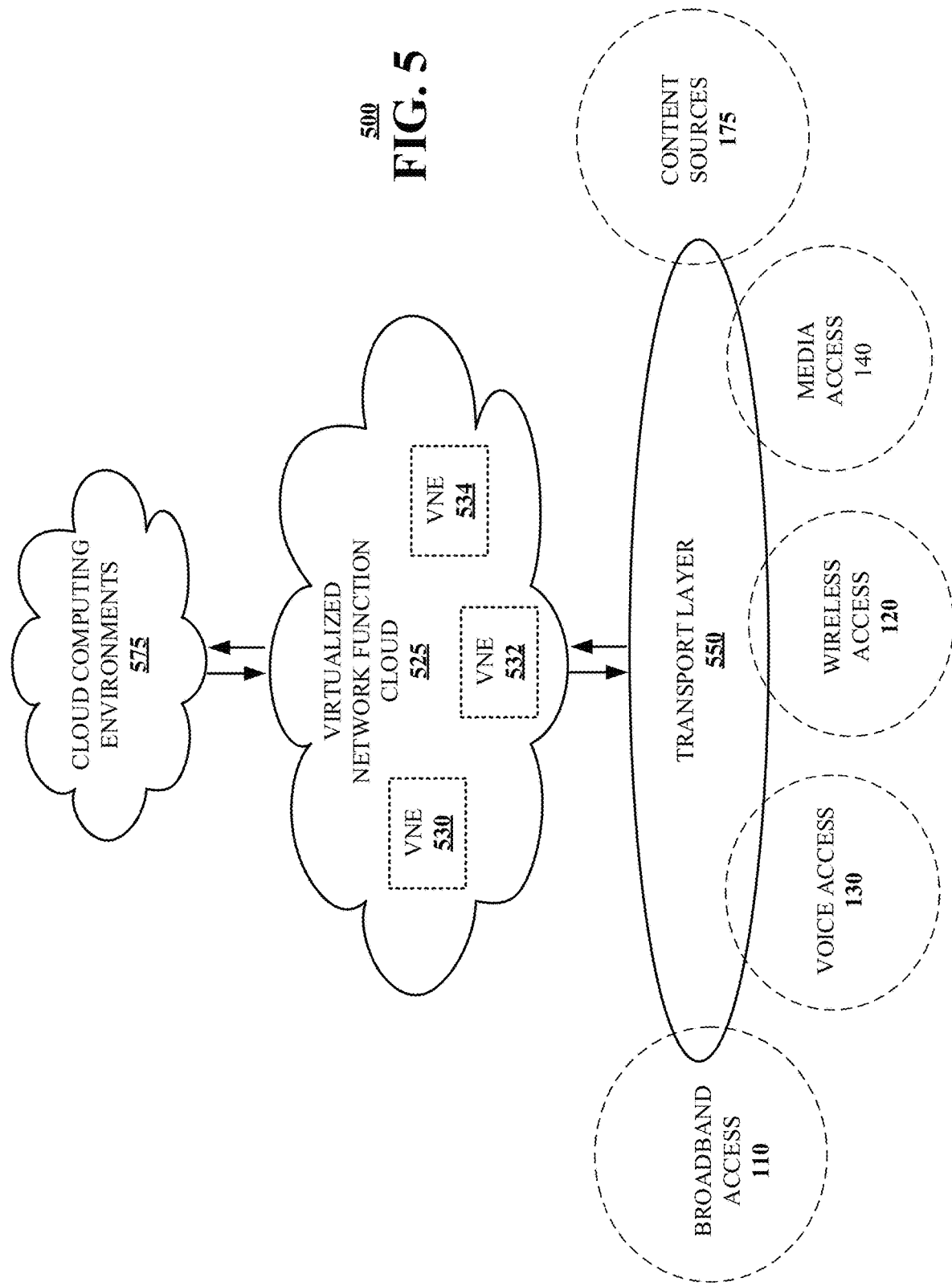
FIG. 5 is a block diagram illustrating an example, non-limiting embodiment of a virtualized communication network in accordance with various aspects described herein.

Referring now to FIG. 5, a block diagram 500 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of RAN node 202, and operations of method 400 presented in FIGS. 1, 2A, 2B, 2C, 3, and 4. For example, virtualized communication network 500 can facilitate in whole or in part initiating emergency QoS measures in a RAN cell responsive to detecting an emergency condition applicable to the RAN cell, identifying a set of non-emergency devices from among a plurality of wireless communication devices served by a RAN cell in which emergency QoS measures are initiated, identifying a non-emergency device for which carrier aggregation is likely to be initiated as a result of emergency QoS measures, and/or applying an updated buffer threshold value for such a device to reduce the likelihood that carrier aggregation will be initiated for that device.

In particular, a cloud networking architecture is shown that leverages cloud technologies and supports rapid innovation and scalability via a transport layer 550, a virtualized network function cloud 525 and/or one or more cloud computing environments 575. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 530, 532, 534, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 530 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 550 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 530, 532 or 534. These network elements can be included in transport layer 550.

The virtualized network function cloud 525 interfaces with the transport layer 550 to provide the VNEs 530, 532, 534, etc. to provide specific NFVs. In particular, the virtualized network function cloud 525 leverages cloud operations, applications, and architectures to support networking workloads. The virtualized network elements 530, 532 and 534 can employ network function software that provides either a one-for-one mapping of traditional network element function or alternately some combination of network functions designed for cloud computing. For example, VNEs 530, 532 and 534 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 530, 532, 534, etc. can be instantiated and managed using an orchestration approach similar to those used in cloud compute services.

The cloud computing environments 575 can interface with the virtualized network function cloud 525 via APIs that expose functional capabilities of the VNEs 530, 532, 534, etc. to provide the flexible and expanded capabilities to the virtualized network function cloud 525. In particular, network workloads may have applications distributed across the virtualized network function cloud 525 and cloud computing environment 575 and in the commercial cloud, or might simply orchestrate workloads supported entirely in NFV infrastructure from these third party locations.

Figure 6:
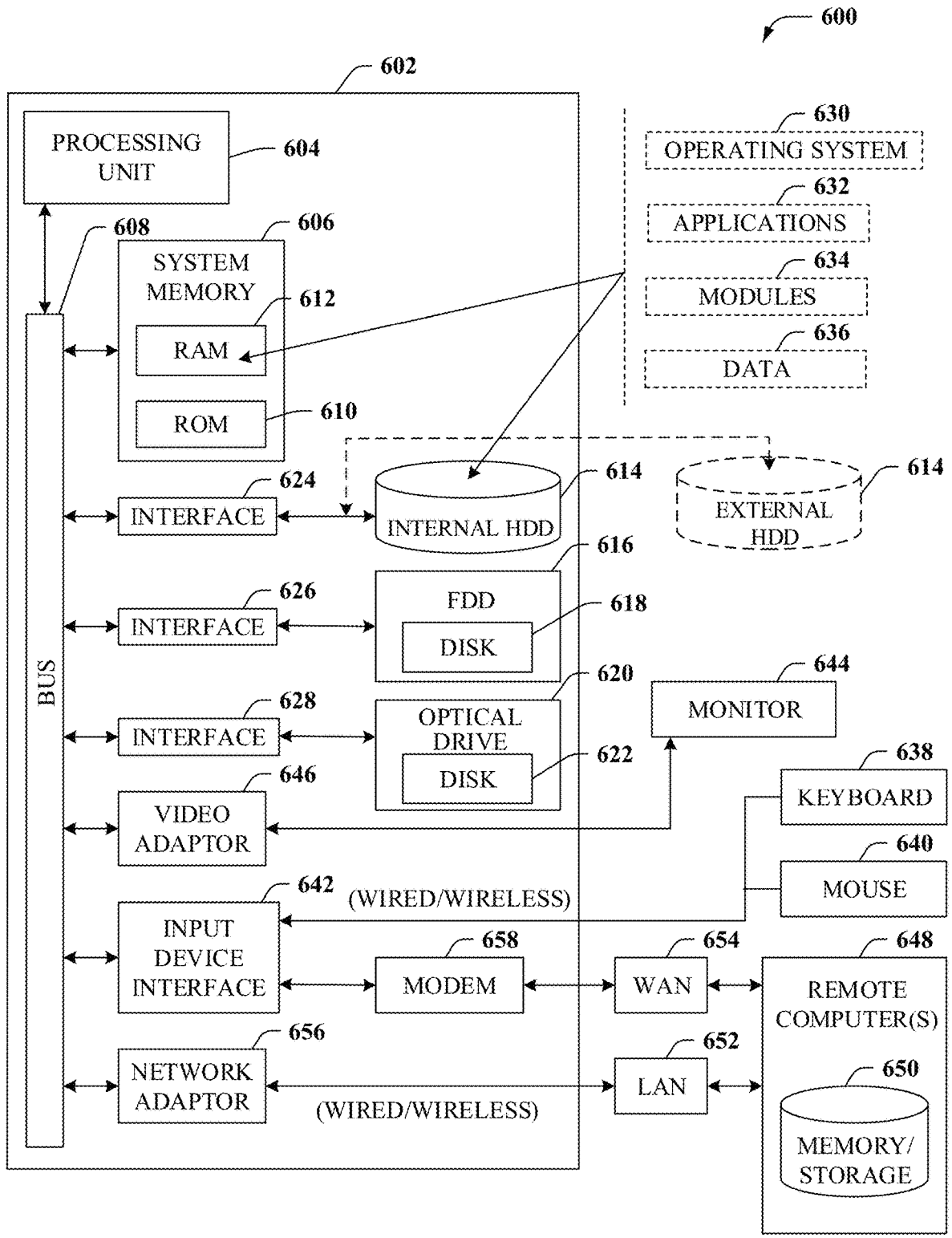
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, and/or VNEs 530, 532, 534, etc. Each of these devices can be implemented via computer-executable instructions that can run on one or more computers, and/or in combination with other program modules and/or as a combination of hardware and software. For example, computing environment 600 can facilitate in whole or in part initiating emergency QoS measures in a RAN cell responsive to detecting an emergency condition applicable to the RAN cell, identifying a set of non-emergency devices from among a plurality of wireless communication devices served by a RAN cell in which emergency QoS measures are initiated, identifying a non-emergency device for which carrier aggregation is likely to be initiated as a result of emergency QoS measures, and/or applying an updated buffer threshold value for such a device to reduce the likelihood that carrier aggregation will be initiated for that device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
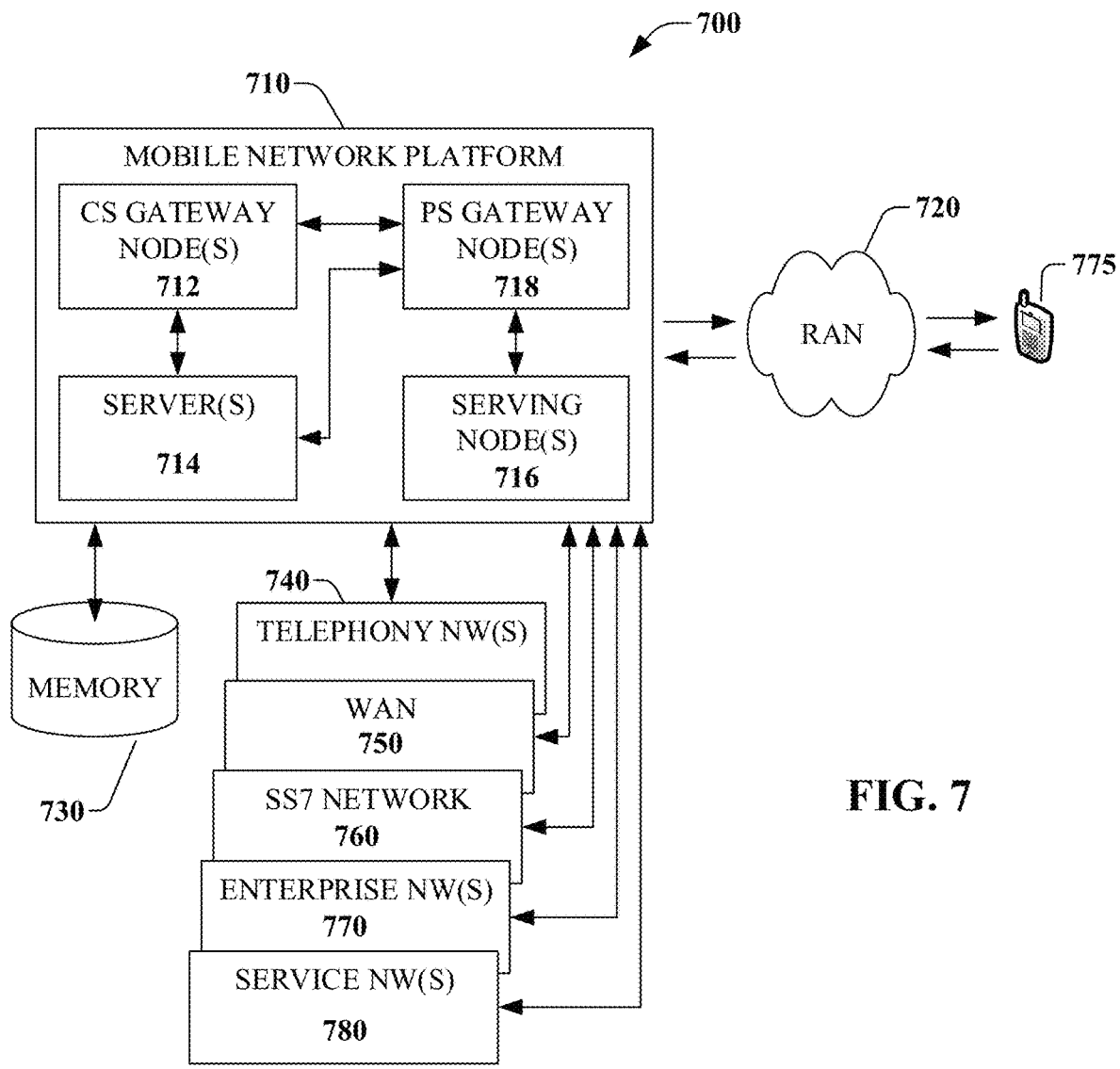
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 150, 152, 154, 156, and/or VNEs 530, 532, 534, etc. For example, platform 710 can facilitate in whole or in part initiating emergency QoS measures in a RAN cell responsive to detecting an emergency condition applicable to the RAN cell, identifying a set of non-emergency devices from among a plurality of wireless communication devices served by a RAN cell in which emergency QoS measures are initiated, identifying a non-emergency device for which carrier aggregation is likely to be initiated as a result of emergency QoS measures, and/or applying an updated buffer threshold value for such a device to reduce the likelihood that carrier aggregation will be initiated for that device. In one or more embodiments, the mobile network platform 710 can generate and receive signals transmitted and received by base stations or access points such as base station or access point 122. Generally, mobile network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 710 can be included in telecommunications carrier networks, and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. CS gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology(ies) utilized by mobile network platform 710 for telecommunication over a radio access network 720 with other devices, such as a radiotelephone 775.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the mobile network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in technology resource(s) or radio access network 720, PS gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, mobile network platform 710 also comprises serving node(s) 716 that, based upon available radio technology layer(s) within technology resource(s) in the radio access network 720, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in mobile network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to mobile network platform 710 (e.g., deployed and operated by the same service provider), such as the distributed antennas networks shown in FIG. 1(*s*) that enhance wireless service coverage by providing more network coverage.

It is to be noted that server(s) 714 can comprise one or more processors configured to confer at least in part the functionality of mobile network platform 710. To that end, the one or more processor can execute code instructions stored in memory 730, for example. It is should be appreciated that server(s) 714 can comprise a content manager, which operates in substantially the same manner as described hereinbefore.

In example embodiment 700, memory 730 can store information related to operation of mobile network platform 710. Other operational information can comprise provisioning information of mobile devices served through mobile network platform 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, SS7 network 760, or enterprise network(s) 770. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
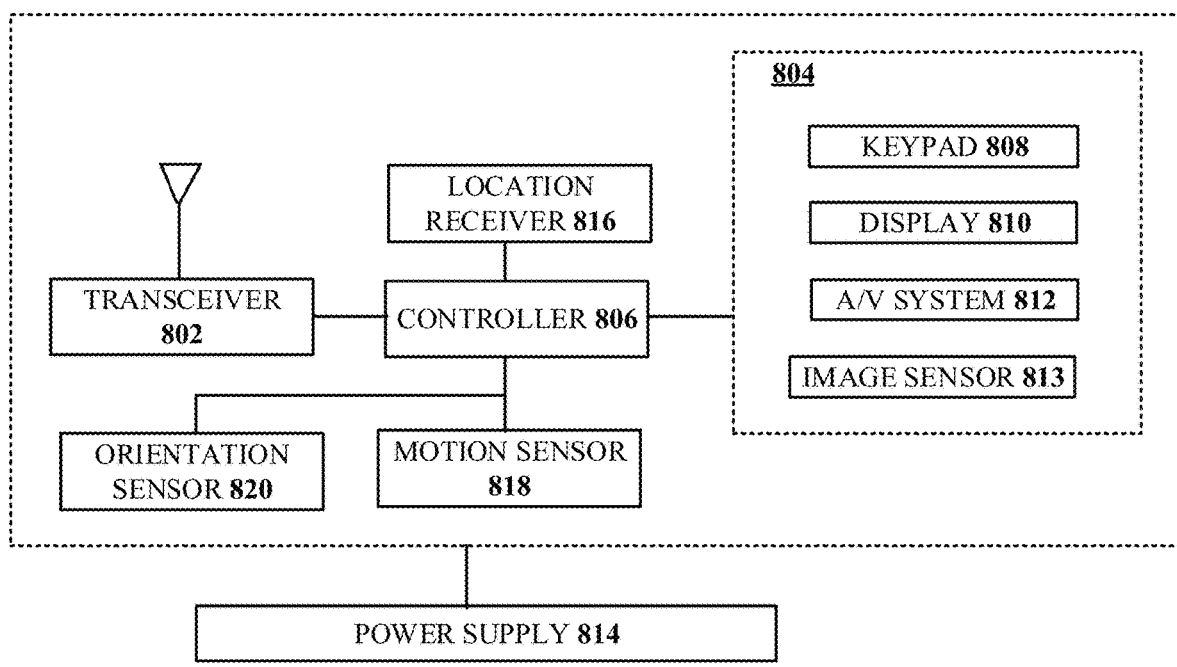
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 114, mobile devices 124, vehicle 126, display devices 144 or other client devices for communication via either communications network 125. For example, computing device 800 can facilitate in whole or in part initiating emergency QoS measures in a RAN cell responsive to detecting an emergency condition applicable to the RAN cell, identifying a set of non-emergency devices from among a plurality of wireless communication devices served by a RAN cell in which emergency QoS measures are initiated, identifying a non-emergency device for which carrier aggregation is likely to be initiated as a result of emergency QoS measures, and/or applying an updated buffer threshold value for such a device to reduce the likelihood that carrier aggregation will be initiated for that device.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system for a radio access network (RAN) node, the processing system including a processor; and
    a memory that stores executable instructions that, when executed by the processing system, facilitate performance of operations, the operations comprising:
        identifying, among a set of communication devices communicating with the RAN node, one or more carrier aggregation (CA)-prone devices; and
        applying an updated buffer threshold value for at least one CA-prone device among the one or more CA-prone devices, to reduce a likelihood of initiation of carrier aggregation for the at least one CA-prone device.

2. The device of claim 1, wherein the identifying the one or more CA-prone devices comprises identifying the one or more CA-prone devices based on QoS class indices of the set of communication devices communicating with the RAN node.

3. The device of claim 1, wherein the applying the updated buffer threshold is responsive to detecting an emergency condition applicable to the RAN node, and wherein the one or more CA-prone devices are identified as non-emergency devices.

4. The device of claim 1, wherein the operations further comprise:
    identifying a set of CA-capable devices from among the set of communication devices communicating with the RAN node; and
    identifying the one or more CA-prone devices from among the set of CA-capable devices.

5. The device of claim 1, wherein the operations further comprise selecting the updated buffer threshold value based on a type of traffic being conveyed to the at least one CA-prone device.

6. The device of claim 1, wherein the operations further comprise selecting the updated buffer threshold value based on a burstiness associated with traffic being conveyed to the at least one CA-prone device.

7. The device of claim 1, wherein the operations further comprise:
    determining a respective buffer threshold time for each of the set of communication devices communicating with the RAN node; and
    selecting the one or more CA-prone devices from among the set of communication devices communicating with the RAN node based on the respective buffer threshold time for the one or more CA-prone devices.

8. The device of claim 7, wherein the operations further comprise determining the respective buffer threshold time for each of the set of communication devices communicating with the RAN node based on a respective data throughput estimate for each of the set of communication devices communicating with the RAN node.

9. The device of claim 8, wherein the operations further comprise:
    monitoring respective traffic patterns of each of the set of communication devices communicating with the RAN node to obtain traffic monitoring data; and
    determining the respective data throughput estimate for each of the one or more CA-prone devices based on respective traffic monitoring data for each of the set of communication devices communicating with the RAN node, according to a queuing model.

10. The device of claim 7, wherein the operations further comprise determining the respective buffer threshold time for each of the set of communication devices communicating with the RAN node based on a respective data throughput variability for each of the set of communication devices communicating with the RAN node.

11. The device of claim 1, wherein the RAN node comprises a node of a next generation RAN (NG-RAN).

12. The device of claim 1, wherein the RAN node comprises a next generation node B (gNB).

13. A non-transitory machine-readable storage medium, comprising executable instructions that, when executed by a processing system for a radio access network node, the processing system including a processor, facilitate performance of operations, the operations comprising:
    identifying one or more carrier aggregation (CA)-prone devices among a plurality of wireless communication devices served by a Radio Access Network (RAN) node;

selecting an updated buffer threshold value for a CA-prone device among the one or more CA-prone devices based on a type of traffic being conveyed to the CA-prone device, a burstiness associated with traffic being conveyed to the CA-prone device, or a combination thereof; and applying the updated buffer threshold value for the CA-prone device among the one or more CA-prone devices to reduce a likelihood of initiation of carrier aggregation for the CA-prone device.

14. The non-transitory machine-readable storage medium of claim 13, wherein the operations further comprise identifying the one or more CA-prone devices based on QoS class indices of the plurality of wireless communication devices served by the RAN node.

15. The non-transitory machine-readable storage medium of claim 13, wherein the applying the updated buffer threshold value is responsive to detecting an emergency condition applicable to the RAN node, and wherein the one or more CA-prone devices are identified as non-emergency devices.

16. The non-transitory machine-readable storage medium of claim 13, wherein the operations further comprise selecting the updated buffer threshold value based on a burstiness associated with traffic being conveyed to the one or more CA-prone devices.

17. The non-transitory machine-readable storage medium of claim 13, wherein the radio access network node comprises a next generation node B (gNB).

18. A method, comprising:
identifying, by a processing system including a processor, one or more carrier aggregation (CA)-prone devices among a plurality of wireless communication devices served by a Radio Access Network (RAN) node;

selecting, by the processing system, an updated buffer threshold value for a CA-prone device among the one or more CA-prone devices based on a type of traffic being conveyed to the CA-prone device, a burstiness associated with traffic being conveyed to the CA-prone device, or a combination thereof; and applying the updated buffer threshold value for the CA-prone device among the one or more CA-prone devices to reduce a likelihood of initiation of carrier aggregation for the CA-prone device.

19. The method of claim 18, wherein the applying the updated buffer threshold value is responsive to detecting an emergency condition applicable to the RAN node, and wherein the CA-prone device is identified as a non-emergency device.

20. The method of claim 18, wherein the RAN node comprises a node of a next generation RAN (NG-RAN).

* * * * *